(12) United States Patent
Shiraishi et al.

(10) Patent No.: US 11,091,098 B2
(45) Date of Patent: Aug. 17, 2021

(54) STORAGE APPARATUS PROVIDED ON WORKING VEHICLE

(71) Applicant: TAKEUCHI MFG. CO., LTD., Nagano (JP)

(72) Inventors: Shingo Shiraishi, Nagano (JP); Nobuyuki Sakurai, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 184 days.

(21) Appl. No.: 16/520,536

(22) Filed: Jul. 24, 2019

(65) Prior Publication Data

US 2020/0298765 A1 Sep. 24, 2020

(30) Foreign Application Priority Data

Mar. 22, 2019 (JP) .............................. JP2019-054126

(51) Int. Cl.
*B60R 7/04* (2006.01)
*B60R 7/00* (2006.01)
*E05B 83/28* (2014.01)

(52) U.S. Cl.
CPC ................ *B60R 7/04* (2013.01); *B60R 7/005* (2013.01); *E05B 83/28* (2013.01);
(Continued)

(58) Field of Classification Search
CPC .......... B60R 7/04; B60R 7/005; E05B 83/28; E05Y 2900/538
(Continued)

(56) References Cited

U.S. PATENT DOCUMENTS 6,313,394 B1 * 11/2001 Shugar .................... B60L 8/003
136/244
2010/0032984 A1 2/2010 Murakami et al.
(Continued)

FOREIGN PATENT DOCUMENTS

EP 2151527 2/2010
EP 2397911 12/2011
(Continued)

OTHER PUBLICATIONS

Partial European Search Report dated Dec. 10, 2019 in corresponding European Application No. 19181538.0.
(Continued)

*Primary Examiner* — D Glenn Dayoan
*Assistant Examiner* — E Turner Hicks
(74) *Attorney, Agent, or Firm* — Stephen J. Weyer, Esq.; Stites & Harbison, PLLC

(57) ABSTRACT

There is provided a storage apparatus for documents capable of preventing the storage apparatus from being an obstacle to getting-on/off motions and securing front visibility in good condition. A storage apparatus includes a frame having an opening and wall portions and a lid portion attached to the frame, in which an entrance of the canopy is provided on a left side or a front side of a vehicle body, the frame is fixed to a right side of the vehicle body, the lid portion has a structure in which a right end is attached to the right wall portion of the frame, a left end turns between a position of the left wall portion and a position in a lower direction of the right wall portion, and a holding portion holding the documents is provided in an inner surface.

10 Claims, 6 Drawing Sheets

(52) U.S. Cl.
CPC ... *B60Y 2200/411* (2013.01); *B60Y 2200/412* (2013.01); *E05Y 2900/538* (2013.01)

(58) Field of Classification Search
USPC .................................. 296/37.7, 37.8, 37.1
See application file for complete search history.

(56) References Cited

U.S. PATENT DOCUMENTS

| | | | |
|---|---|---|---|
| 2011/0304169 A1 | 12/2011 | Nakayoshi | |
| 2013/0193706 A1* | 8/2013 | Minelli | B60R 11/02 296/37.8 |
| 2013/0292220 A1 | 11/2013 | Kerley | |
| 2014/0103085 A1* | 4/2014 | Patronik | B60R 9/058 224/318 |
| 2015/0233630 A1 | 8/2015 | Bond | |

FOREIGN PATENT DOCUMENTS

| | | |
|---|---|---|
| GB | 2489832 | 10/2012 |
| JP | S56171388 | 12/1981 |
| JP | 2000273910 | 10/2000 |
| JP | 2002121769 | 4/2002 |
| JP | 2010188868 | 9/2010 |
| JP | 2014031693 | 2/2014 |
| JP | 2015-086617 | 5/2015 |
| JP | 5949726 | 7/2016 |
| WO | WO-2017084933 | 5/2017 |

OTHER PUBLICATIONS

Extended European Search Report dated Feb. 26, 2020 in corresponding European Application No. 19181538.0.

\* cited by examiner

PART II

PART V

STORAGE APPARATUS PROVIDED ON WORKING VEHICLE

CROSS-REFERENCE TO RELATED APPLICATION

This application is based upon and claims the benefit of priority of the prior Japanese Patent Application No. P2019-54126, filed on Mar. 22, 2019, and the entire contents of which are incorporated herein by reference.

TECHNICAL FIELD

The present invention relates to a storage apparatus, and further relates to a storage apparatus for documents provided at a ceiling part of a canopy in a working vehicle.

BACKGROUND ART

As an example of the working vehicle, a power shovel including a travel unit having a right-and-left pair of crawlers, a vehicle body provided so as to swivel above the travel unit and a shovel unit provided in a front part of the vehicle body has been known from the past.

For example, in a related-art power shovel including the canopy, documents such as an instruction manual are stored on the back side of a door attached in a space below a seat. Accordingly, there is a problem that it is difficult to perform an operation of releasing a lock of the door and opening the door to take out documents in a state where an operator sits on the seat. Moreover, in a case where the vehicle is parked and stored outdoors, there is a problem that rainwater enters the space to wet documents. In a case where the stored documents are not sufficiently fixed, there is a problem that the documents are damaged due to vibration during work. Furthermore, in a case of a vehicle using a battery as a drive source, not an engine, it is necessary to secure a wide space for mounting the battery, control equipment and the like below the seat, therefore, there is a problem that it is difficult to manage to secure the space for storing the documents.

Here, as an example of the related-art storage apparatus provided on the working vehicle, a structure described in PTL 1 (Japanese Patent No. 5949726) is disclosed. According to the structure, some of the above problems may be solved or improved.

SUMMARY OF INVENTION

Technical Problem

However, the storage apparatus provided on the working vehicle shown as the example in PTL 1 is arranged at a central position close to the front part in the ceiling part. Accordingly, the apparatus can be an obstacle to getting-on/off motions, such as a case where a head of the operator touches the storage apparatus when getting on/off the vehicle in the working vehicle in which an entrance for the operator is provided on the front side or on the left side of a vehicle body. The apparatus also will be a factor whereby front visibility is narrowed. Furthermore, in a case where a lid portion is not capable of being closed due to a failure, a defect or the like in a key portion (lock portion), the lid portion hangs down and blocks the front visibility, which hinders implementation of work.

In response to the above issue, one or more aspects of the present invention are directed to a storage apparatus for documents capable of preventing the storage apparatus from being an obstacle to getting-on/off motions when the operator gets on/off the vehicle, capable of securing front visibility in good condition at the time of working and capable of implementing work without block of front visibility even when the key portion is failed or other cases in the canopy of the working vehicle.

Solution to Problem

In view of the above, the following embodiments are described below.

A storage apparatus according to the present invention is a storage apparatus for documents provided at a ceiling part of a canopy of a working vehicle, which includes a frame having an opening facing downward and wall portions provided around the opening, and a lid portion attached to the frame so as to turn and opening/closing the opening, in which an entrance of the canopy is provided on a left side or a front side of a vehicle body, the frame is fixed to a right side of the vehicle body, the lid portion has a structure in which a right end is attached to the right wall portion of the frame by using hinges, a left end turns so as to draw an arc between a position of the left wall portion of the frame and a position in a lower direction of the right wall portion to open/close the opening, and a holding portion housing and holding the documents is provided in an inner surface facing the opening.

Advantageous Effects of Invention

According to the present invention, it is possible to realize a storage apparatus capable of preventing the storage apparatus from being an obstacle to getting-on/off motions when the operator get on/off the vehicle and capable of securing front visibility during work in good condition in the working vehicle in which the entrance is provided on the front side or the lift side of the vehicle body. Furthermore, the storage apparatus for documents capable of implementing work without blocking of front visibility even when the key portion fails or other cases.

DESCRIPTION OF EMBODIMENTS

Figure 1:
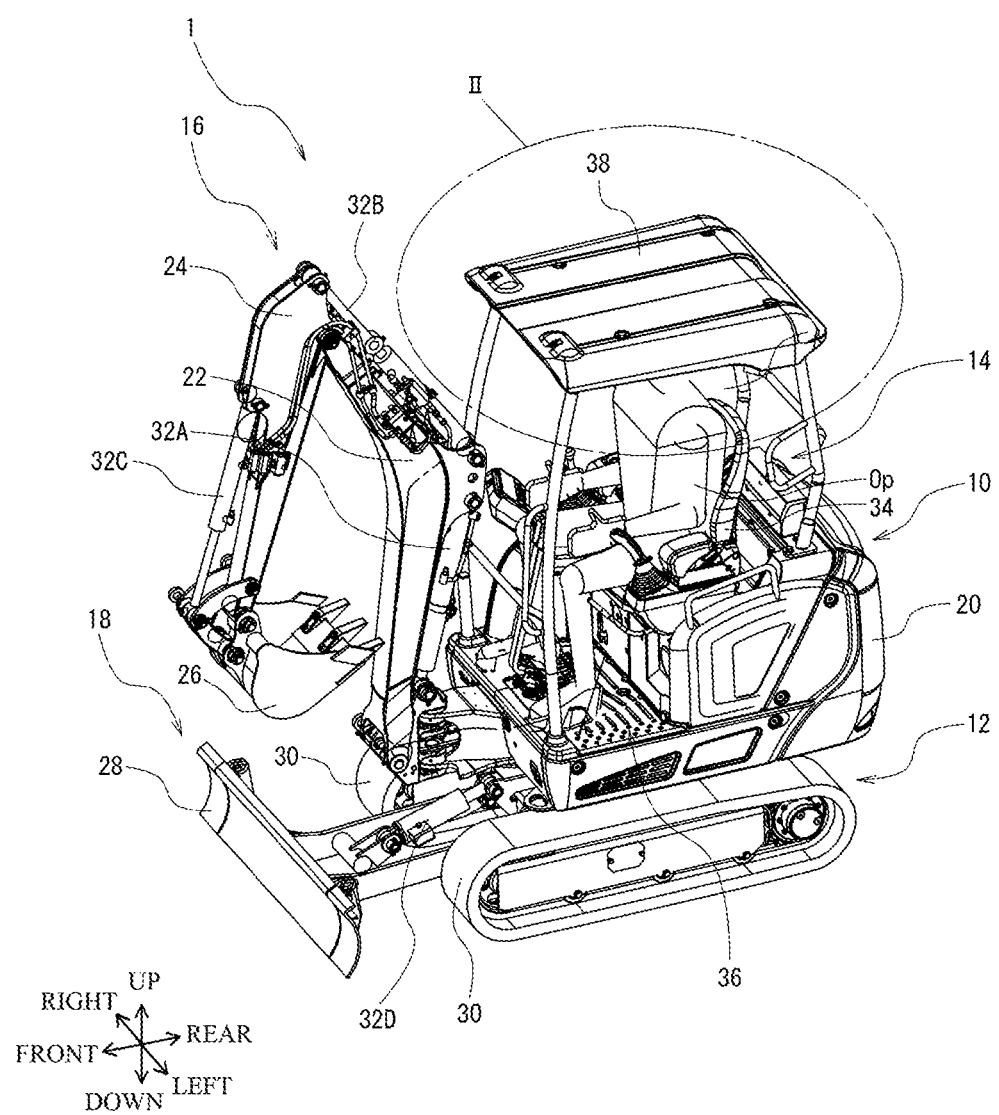
FIG. 1 is a perspective view showing an example of a working vehicle on which a storage apparatus according to an embodiment of the present invention is mounted.
Figure 2:
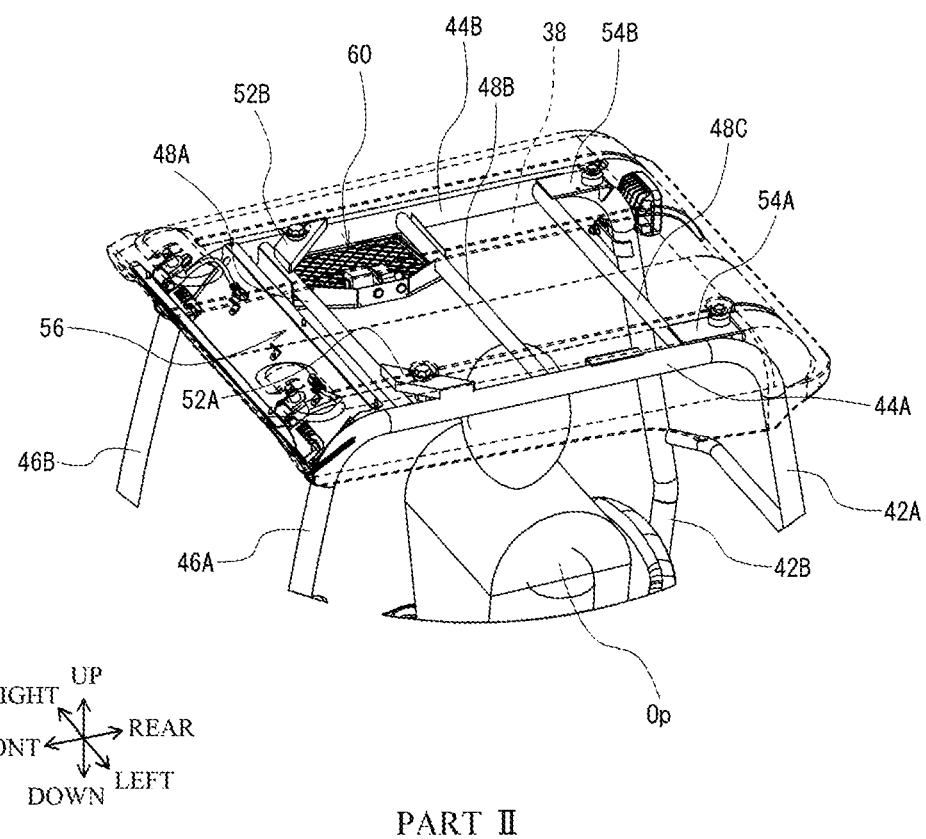
FIG. 2 is an enlarged view of a part II in FIG. 1.

Hereinafter, an embodiment of the present invention will be explained in detail with reference to the drawings. FIG. 1 is a schematic view (perspective view seen from a front upper direction) showing an example of a working vehicle 1 on which a storage apparatus 60 according to the embodiment is mounted. FIG. 2 is an enlarged view of a part II in FIG. 1, in which a structure of a ceiling part 56 can be visually recognized by showing a roof 38 by a broken line. In all drawings for explaining the embodiment, the same symbols are given to members having the same functions, and repeated explanation thereof may be omitted.

First, the entire structure of the working vehicle 1 will be explained. Although a power shovel traveling with crawlers (endless crawler belts) is explained as an example here, the vehicle is not limited to this.

The working vehicle 1 is configured by including a travel unit 12 having a right-and-left pair of crawlers 30, a vehicle body 10 provided so as to swivel above the travel unit 12 and a driving unit (a shovel unit 16, a blade unit 18 and so on) provided in the travel unit 12 or the vehicle body 10 as shown in FIG. 1. The vehicle body 10 is also provided with an open-type canopy 14 in which an operator (worker) rides and perform operation in a central part, and is provided with an engine room 20 in which a drive source (an engine (not shown) as an example) for driving the travel unit, the driving unit and so on) in a rear part. The travel unit 12 is not limited to the right-and-left pair of crawlers, and may have a structure of having a right-and-left tires (not shown). It is also preferable to adopt a structure in which the travel unit, the driving unit and so on are driven by a battery instead of the engine or together with the engine (not shown).

First, the driving unit such as the shovel unit 16 and the blade unit 18 will be explained. The shovel unit 16 is configured by including a boom 22 pivotally connected to the front of the vehicle body 10 so as to vertically swing, an arm 24 pivotally connected to a nose of the boom 22 so as to vertically swing and a bucket 26 pivotally connected to a nose of the arm 24 so as to vertically swing. On the other hand, the blade unit 18 is configured to including a blade 28 pivotally connected to the front of the travel unit 12 so as to vertically swing. These respective mechanisms are operated to swing by a hydraulically-operated cylinders 32A to 32D.

A mechanism for driving the hydraulically-operated cylinders 32A to 32D is configured by a hydraulic pump, a control valve and so on driven by the above driving source (all of them are not shown). The control valve and so on are operated in accordance with operation by the operator to perform control of supplying working fluid fed from the hydraulic pump to respective cylinders. Accordingly, the bucket 26 and the blade 28 perform desired actions to thereby perform work such as drilling. The driving unit is not limited to the above shovel unit 16 and the blade unit 18, and includes other units driven by the working fluid fed from the hydraulic pump.

Next, the canopy 14 is configured by including a seat 34 on which the operator sits when getting on the vehicle, various operation levers and operation switches for operating actions of the travel unit 12 and the driving unit, a display device for displaying various vehicle information and so on. Moreover, an entrance 36 where the operator gets on/off the vehicle is provided on a left side close to the front of the vehicle body 10. It is also preferable to adopt a structure in which the entrance is provided on a forward side (a front side facing the boom 22) of the vehicle body 10 as a modification example.

The canopy 14 is also provided with the roof 38 on the top thereof. Here, as support members for supporting the roof 38, there are provided rear pillars (a first rear pillar 42A on the left side and a second rear pillar 42B on the right side) respectively provided to stand on right and left in the rear of the vehicle body 10 and side beams (a first side beam 44A on the left side and a second side beam 44B on the right side) respectively provided in a front and rear direction from upper parts of respective rear pillars 42A, 42B toward the front of the vehicle body 10. Moreover, the other ends (front parts) of respective side beams 44A, 44B are fixed to and supported by front pillars (a first front pillar 46A on the left side and a second front pillar 46B on the right side) respectively provided to stand on right and left in the front of the vehicle body 10.

Furthermore, a plurality of cross beams bridging the first side beam 44A and the second side beam 44B are arranged. In the embodiment, a first cross beam 48A, a second cross beam 48B and a third cross beam 48C are provided sequentially from the front to the rear of the vehicle body 10 as an example. In this case, the second cross beam 48B is arranged forwarder than a position just above a head of the operator sitting on the seat 34. However, the number of cross beams is not limited to three, and two or four or more beams may be provided (not shown).

With the above structure, the roof 38 is fixed to the side beams 44A, 44B, the cross beams 48A, 48B, 48C and so on through fastening parts 52A, 52B, 54A, 54B for fastening bolts. A structure in which headlights 40 are fixed to the roof 38 is adopted, however, a structure in which the headlights 40 are fixed to the front pillars 46A, 46B, the side beams 44A, 44B, the cross beam 48A and so on may be adopted (not sown).

Figure 3:
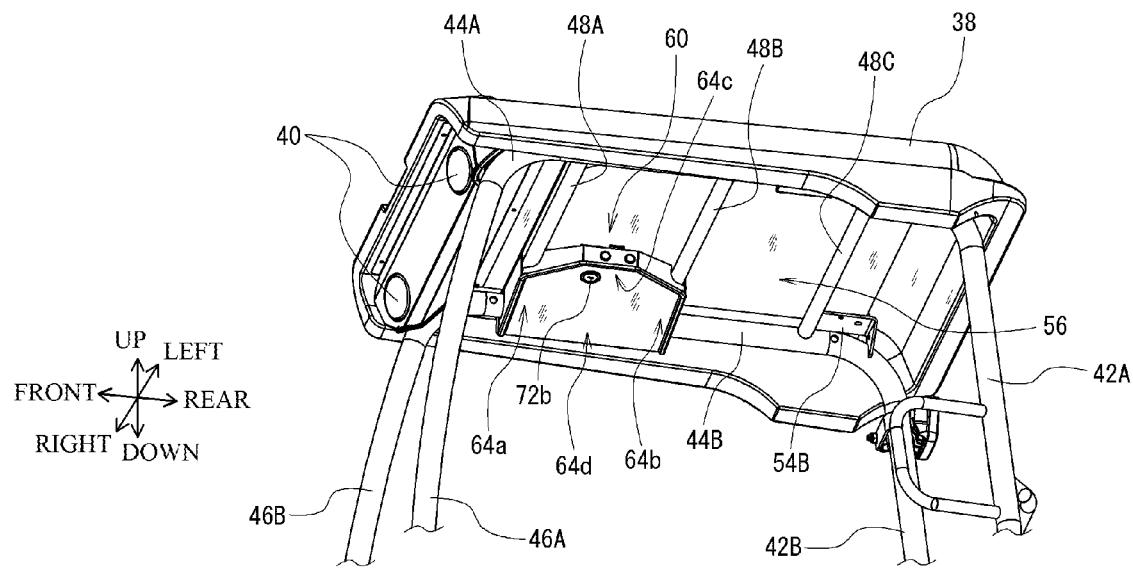
FIG. 3 is a perspective view showing an example of the storage apparatus according to the embodiment of the present invention.
Figure 4:
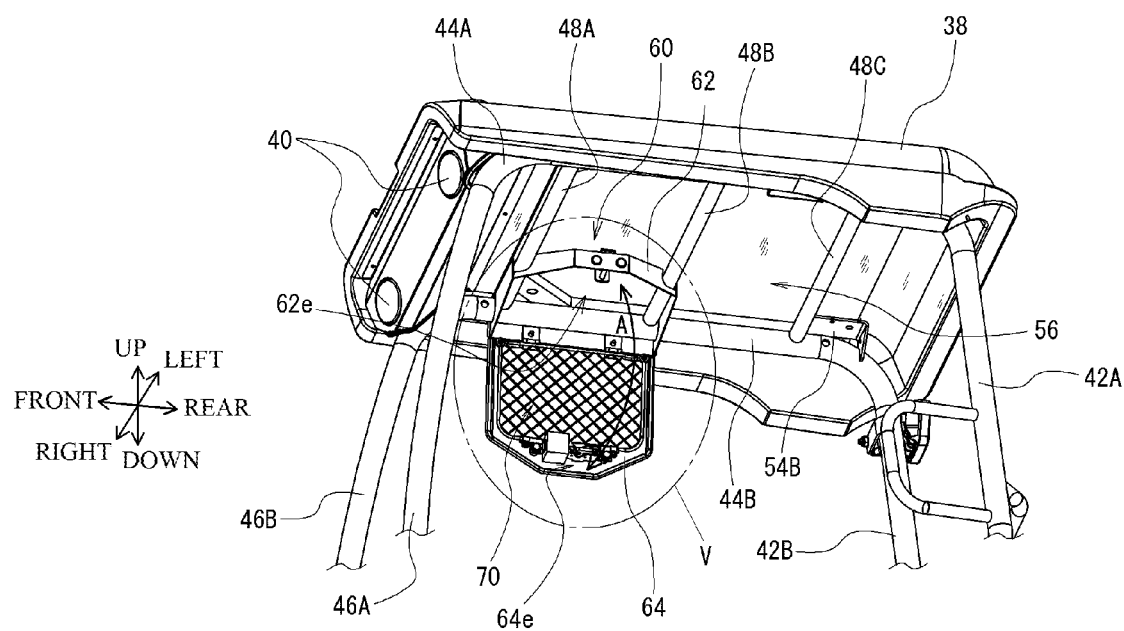
FIG. 4 is a perspective view showing an example of the storage apparatus according to the embodiment of the present invention.
Figure 5:
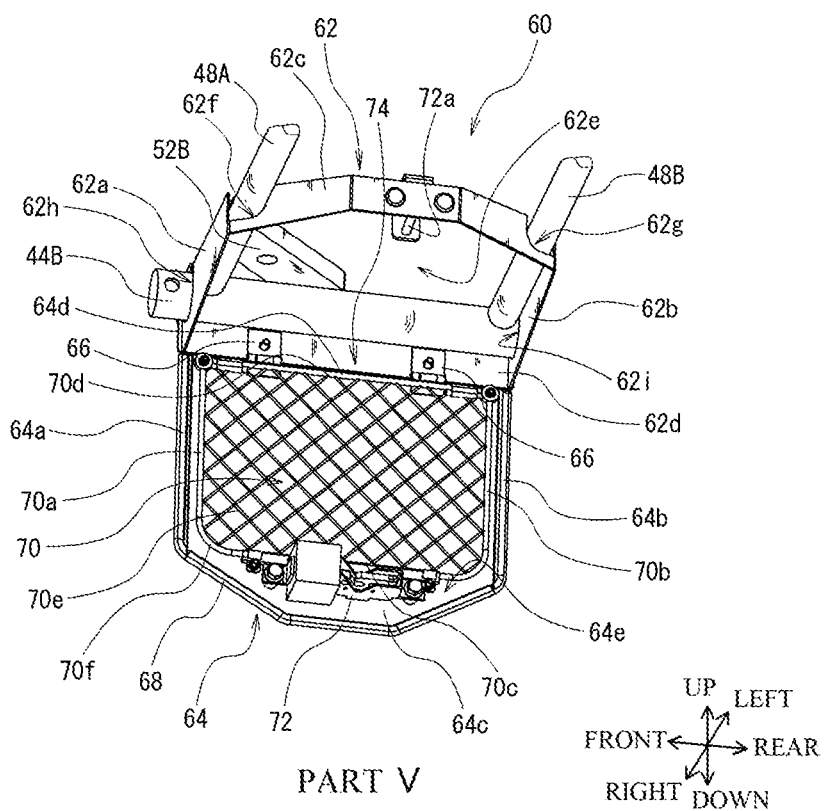
FIG. 5 is an enlarged view of a part "V" in FIG. 4.
Figure 6:
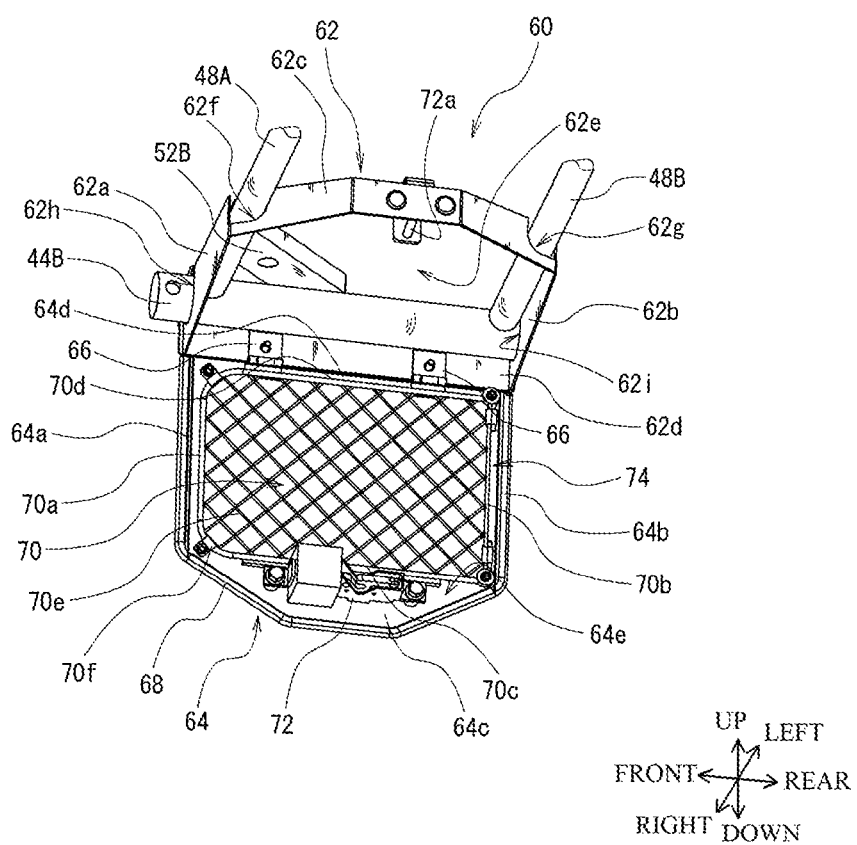
FIG. 6 is a perspective view showing another example of the storage apparatus according to the embodiment of the present invention.
Figure 7:
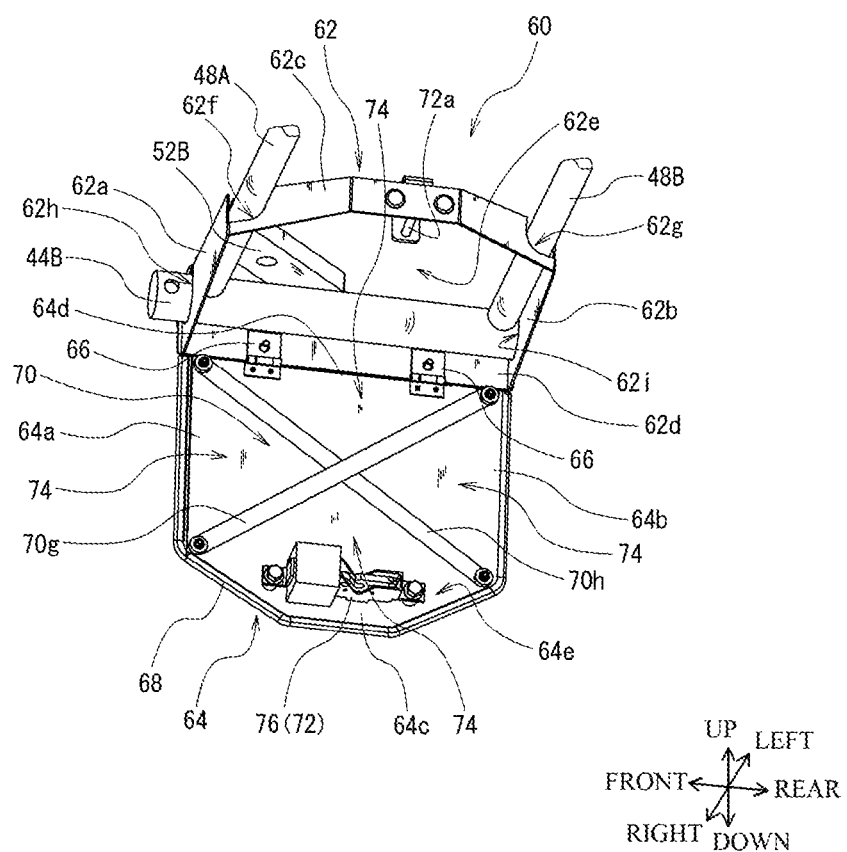
FIG. 7 is a perspective view showing another example of the storage apparatus according to the embodiment of the present invention.

The canopy 14 is also provided with the storage apparatus 60 storing objects to be stored (documents such as an instruction manual and an inspection certificate) in the ceiling part 56 (namely, a region close to a lower surface of the roof 38). Here, FIG. 3 is a schematic view (a perspective view concerning the vicinity of the ceiling part 56 seen from a front lower direction) showing an example of the working vehicle 1 on which the storage apparatus 60 according to the embodiment is mounted, which is in a state where a lid portion 64 of the storage apparatus 60 is closed. FIG. 4 is a schematic view (a perspective view concerning the vicinity of the ceiling part 56 seen from the front lower direction) showing an example of the working vehicle 1 on which the storage apparatus 60 according to the embodiment is mounted, which is in a state where the lid portion 64 of the storage apparatus 60 is opened. FIG. 5 is a schematic view showing an example (a first example) of the storage apparatus 60 according to the embodiment of the present invention, which is an enlarged view of a part "V" in FIG. 4. FIG. 6 is a schematic view (a perspective view at the same position as FIG. 5) showing another example (a second example) of the storage apparatus 60 according to the embodiment of the present invention. FIG. 7 is a schematic view (a perspective view at the same position as FIG. 5) showing further another example (a third example) of the storage apparatus 60 according to the embodiment of the present invention.

The storage apparatus 60 includes a frame 62 having an opening 62e facing downward and continuous front, rear, right and left respective wall portions 62a, 62b, 62c, 62d provided around the opening 62e. The storage apparatus 60 is also provided with the plate-shaped lid portion 64 attached to the frame 62 so as to turn with respect to the frame 62 to open/close the opening 62e. As an example, both of the frame 62 and the lid portion 64 are formed by using a metal material (a steel material such as SPHC as an example). Though the frame 62 also has an opening facing upward, the opening is closed by the lower surface of the roof 38 when fixed to a predetermined position.

Here, the lid portion 64 is provided so that a right end 64d is attached to the right wall portion 62d of the frame 62 by using hinges 66. Accordingly, the lid portion 64 turns (an arrow A in FIG. 4) so that a left end 64c draws an arc between a position of the left wall portion 62c of the frame 62 and a position in a lower direction of the right wall portion 62d to open/close the opening 62e. The lid portion 64 is also provided with a holding portion 70 housing and holding documents on an inner surface 64e facing the opening 62e. A front end 64a, a rear end 64b, the left end 64c and the right end 64d in the lid portion 64 are defined as a positional relation when the lid portion 64 is in a horizontal state (see FIG. 3). A sealing trim 68 made of an elastomer material is attached around an outer periphery of the lid portion 64, thereby taking countermeasures to prevent injuries in case where the head of the operator touches the lid portion 64.

The frame 62 is fixed to the right side of the vehicle body 10 (the right side with respect to the central position in a right and left direction, which is close to the right end approaching to the second side beam 44B in the present embodiment).

According to the storage apparatus 60 having the above structure, the above problems can be solved in the working vehicle 1 in which the entrance 36 of the canopy 14 is provided on the left side (or the front side) of the vehicle body 10. That is, the risk in which the head touches the storage apparatus when the operator gets on/off from the entrance 36 can be solved (or reduced) as compared with the structure in which the storage apparatus is provided in the central position in the right and left direction of the vehicle body 10. Additionally, the position of the roof 38 can be set lower as the front visibility can be widely secured, therefore, the vehicle (particularly an overall height) can be constructed in a compact manner. Furthermore, in a case where the lid portion 64 is not capable of being closed due to a failure, a defect or the like in a key portion 72 (descried later), the front visibility is not blocked even when the lid portion 64 is hanging down, therefore, the work such as drilling can be executed.

Furthermore, the following problems can be solved. Specifically, an operation of taking out documents can be performed more easily as compared with a case where the storage apparatus is provided in a space below the seat. It is also possible to prevent documents from being wetted by rainwater in a case where the vehicle is parked and stored outdoors. Moreover, the space for mounting the battery, control equipment and the like can be widely secured below the seat.

The frame 62 includes groove-shaped insertion portions 62f, 62g into which two beams of the first cross beam 48A and the second cross beam 48B stretched in the right and left direction in the ceiling part 56 are respectively inserted at two places in the left wall portion 62c close to the front wall portion 62a and close to the rear wall portion 62b. In this case, the frame 62 is fixed to the cross beams 48A, 48B by welding inner peripheral portions of the insertion portions 62f, 62g to the two beams (the first cross beam 48A, the second cross beam 48B) together. Furthermore, the frame 62 includes groove-shaped insertion portions 62h, 62i into which the second side beam 44B stretched in the front and rear direction in the ceiling part 56 is inserted at two places in the front end portion 62a close to the right wall portion 62d and in the rear wall portion 62b close to the right wall portion 62d in the present embodiment. In this case, the frame 62 is fixed to the second side beam 44B by welding inner peripheral portions of the insertion portions 62h, 62i to the second side beam 44B together. It is also preferable to adopt a structure in which the right wall portion 62d is fixed to the second side beam 44B or the roof 38 by bolts from an inner side of the frame 62 (not shown) instead of using the structure in which the front wall portion 62a and the rear wall portion 62b are fixed to the second side beam 44B by welding.

According to the above structure, the structure of the storage apparatus 60 itself and the structure in which the storage apparatus 60 (the frame 62 in this case) is fixed to the ceiling part 56 (specifically, the first cross beam 48A, the second cross beam 48B and so on) can be simplified. As the canopy 14 is the open type and can be easily entered, in a case where the storage apparatus 60 is fixed to the ceiling part 56 (the first cross beam 48A, the second cross beam 48B) by using bolts, the storage apparatus 60 can be detached only by removing bolts, which can cause a risk that documents inside the apparatus are stolen. In response to the above, the storage apparatus 60 is not easily detached from the ceiling part 56 (the first cross beam 48A, the second cross beam 48B) in the above structure, which can prevent documents from being stolen.

The lid portion 64 is provided with the key portion 72 (a well-known push-type door lock as an example) locking and fixing the lid portion 64 to the frame 62 by locking the key portion 72 to a receiving portion 72a provided in the frame 62. A symbol 72b denotes a key cylinder. Here, the entire lid portion 64 according to the embodiment is formed in a hexagonal shape in planar view with corner portions provided at two places in a side of the left end 64c as shown in FIG. 3, FIG. 4 and the like. The entire frame 62 is formed in the hexagonal shape in planar view with bent portions at two places in the left wall portion 62c so as to correspond to the above shape.

According to the above structure, a housing region provided in the lid portion 64 can be formed in a rectangular shape suitable to a shape of documents (normally the rectangular shape). Additionally, a region where the key portion 72 is set can be secured, and a structure in which end portions (an end portion close to the front end 64a and an end portion close to the rear end 64b in the left end 64c) protrude and are angulated can be avoided, therefore, the risk in which the head of the operator touches the end portion can be solved (or reduced).

On the other hand, the holding portion 70 (a first example) provided in the lid portion 64 is formed by using a net 70e knitted so that an outer shape has a rectangular shape by using, for example, rubber string with elasticity. In the net 70e, given three sides (70a, 70b, 70c in this case) of an outer periphery are fixed to the inner surface 64e by using fixing metal fittings 70f. On the other hand, other one side (a side 70d close to the right end 64d of the lid portion 64 in this case) is not fixed to the inner surface 64e, so that a position of this one side 70d becomes a storage opening 74 through which documents are put in or taken out. According to the structure, documents can be put in or taken out through the storage opening 74 by opening the lid portion 64. Note that a structure in which an elastic sheet having a rectangular outer shape (not shown) is used instead of the net 70e may be adopted.

In the present embodiment, as described above, one side not fixed to the inner surface 64e is the side 70d close to the right end 64d of the lid portion 64. According to the structure, there is no danger that documents fall off from the storage opening 74 even in the state where the lid portion 64 hangs down. As the structure in which housed documents are held by using the knitted net 70e, the problem that documents are damaged due to vibration during work can be solved.

According to the structure in which the holding portion 70 for housing documents is provided on the lid portion 64 side, not on the frame 62 side as described above, it is sufficient that a region (area) of the holding portion 70 corresponding to an area of documents is secured. Therefore, the lid portion 64 (namely, also the frame 62) can be reduced in size to approximately the minimum dimension (a dimension equivalent to or slightly larger than documents).

Furthermore, the structure in which the holding portion 70 for housing documents is provided on the lid portion 64 side, not on the frame 62 side, and the net 70e through which the inside can be seen is provided in the holding portion 70 is adopted, thereby determining what kind of documents are housed at first sight only by opening the lid portion 64 to allow the lid portion 64 to hang down so as to be turned downward. Therefore, searching and taking-out of a desired document can be performed at short time easily.

Next, a modification example (a second example) of the holding portion 70 shown in FIG. 6 will be explained. In this example, one side not fixed to the inner surface 64e is the side 70b close to the rear end 64b of the lid portion 64 (that is, three sides 70a, 70c, 70d are fixed to the inner surface 64e by using the fixing metal fittings 70f. According to the structure, the storage opening 74 through which documents are put in or taken out is provided at a position of the side 70b. Therefore, the operator can perform the operation of putting or taking documents in or out of the apparatus through the storage opening 74 only by moving an arm (from an elbow to a hand) in the front and rear direction, therefore, the work will be extremely easy. Also in the modification example, there is no danger that documents fall off from the storage opening 74 in the state where the lid portion 64 hangs down. As the structure in which housed documents are held by using the knitted net 70e is adopted, the problem that documents are damaged due to vibration during work can be solved.

Next, a modification example (a third example) of the holding portion 70 shown in FIG. 7 will be explained. The holding portion 70 in this example is formed by two strings (rubber strings or the like) 70g, 70h having elasticity being stretched so as to cross each other at the center of the inner surface 64e of the lid portion 64. According to the structure, documents can be put in and taken out from all directions of front, rear, right and left (namely, there are storage openings 74 of four places close to the front end 64a, the rear end 64b, the left end 64c and right end 64d in the lid portion 64). However, there is the danger that documents fall off from the storage opening 74 close to the left end 64c of the lid portion 64 in the state where the lid portion 64 hangs down in this modification example. Accordingly, it is preferable to adopt a structure in which a fall-off prevention portion 76 for preventing documents from falling off is fixed to a position close to the left end 64c of the lid portion 64. According to the structure, it is possible to prevent documents from falling off in the state where the lid portion 64 hangs down.

Here, the fall-off prevention portion 76 may be configured as a protruding member provided to stand on a plate surface in the inner surface 64e of the lid portion 64. In the embodiment, the above-described key portion 72 doubles as the fall-off prevention portion 76. Accordingly, the number of parts can be reduced and the structure can be simplified.

Other mechanisms (a driving mechanisms, a control mechanism and so on) for travelling and operations in the working vehicle 1 according to the embodiment are the same as well-known working vehicle (the power shovel in this case), therefore, detailed explanation is omitted.

As explained above, in the working vehicle in which the entrance of the canopy is provided on the left side or the front side of the vehicle body, the risk in which the head touches the storage apparatus when the operator gets on/off the vehicle can be solved or reduced in the storage apparatus according to the present invention. As the front visibility can be widely secured, the position of the roof can be set to be lower, and the overall height of the vehicle can be formed in a compact manner. Moreover, in the case where the lid portion is not capable of being closed due to a failure, a defect and so on in the key portion, the front visibility is not blocked even in the state where the lid portion is hanging down, therefore, the work such as drilling can be performed.

According to the structure in which the holding portion for housing documents on the lid portion side, the storage apparatus can be reduced in size, and searching of documents can be shortened in time and can be performed more easily.

Furthermore, the operation of taking out documents can be performed easily as compared with the structure in which the storage apparatus is provided in the space below the seat. Also in the case where the vehicle is parked and stored outdoors, it is possible to prevent documents from being wetted by rainwater. It is further possible to widely secure the space for mounting the battery, control equipment and so on below the seat.

Here, concerning the working vehicle in which the entrance of the canopy is provided on the right side of the vehicle body, the same operation and effect can be obtained by setting the structure according to the above embodiment with right and left reversed.

The present invention is not limited to the above described embodiment, and various modifications may occur in a scope not departing from the present invention. The explanation has been made by particularly citing the power shovel as an example of the working vehicle, however, the present invention is not limited to this and can be naturally applied to other working vehicles such as a skid-steer loader and a crawler carrier in the same manner.

The storage apparatus according to the present invention is the invention suitably applied to the open-type canopy, however, is can be attached to a closed-type cabin.

Moreover, the storage apparatus according to the present invention is the invention suitably applied to documents such as an instruction manual as an object to be stored, however, other objects such as small articles can be stored.

What is claimed is:

1. A storage apparatus for documents provided at a ceiling part of a canopy of a working vehicle, comprising:
   a frame having an opening facing downward and wall portions provided around the opening; and
   a lid portion attached to the frame so as to turn and opening/closing the opening,
   wherein an entrance of the canopy is provided on a left side or a front side of a vehicle body,
   the frame is fixed to a right side of the vehicle body,
   the lid portion has a structure in which a right end is attached to the right wall portion of the frame by using hinges, a left end turns so as to draw an arc between a position of the left wall portion of the frame and a position in a lower direction of the right wall portion to open/close the opening, and a holding portion housing and holding the documents is provided in an inner surface facing the opening.

2. The storage apparatus according to claim 1, wherein the frame includes insertion portions into which two beams stretched in a right and left direction of the vehicle body in the ceiling part are respectively inserted at two places in the left wall portion close to the front wall portion and close to the rear wall portion, and is fixed to the two beams by welding.

3. The storage apparatus according to claim 1, wherein the holding portion is formed so that an elastic sheet or a net having a rectangular outer shape is fixed to the inner surface at given three sides of an outer periphery, in which other one side is not fixed to be a storage opening for the documents.

4. The storage apparatus according to claim 2, wherein the holding portion is formed so that an elastic sheet or a net having a rectangular outer shape is fixed to the inner surface at given three sides of an outer periphery, in which other one side is not fixed to be a storage opening for the documents.

5. The storage apparatus according to claim 3, wherein the other one side is a side close to the right end or a side close to a rear end when the lid portion is in a horizontal state.

6. The storage apparatus according to claim 4, wherein the other one side is a side close to the right end or a side close to a rear end when the lid portion is in a horizontal state.

7. The storage apparatus according to claim 1, wherein the holding portion is formed by two strings having elasticity being stretched so as to cross each other at the center of the inner surface, and
a fall-off prevention portion for preventing the documents from falling off is fixed to a position close to the left end when the lid portion is in the horizontal state.

8. The storage apparatus according to claim 2, wherein the holding portion is formed by two strings having elasticity being stretched so as to cross each other at the center of the inner surface, and
a fall-off prevention portion for preventing the documents from falling off is fixed to a position close to the left end when the lid portion is in the horizontal state.

9. The storage apparatus according to claim 7, wherein the lid portion includes a key portion locking and fixing the lid portion to the frame by locking the key portion to a receiving portion provided in the frame, and
the key portion doubles as the fall-off prevention portion.

10. The storage apparatus according to claim 8, wherein the lid portion includes a key portion locking and fixing the lid portion to the frame by locking the key portion to a receiving portion provided in the frame, and
the key portion doubles as the fall-off prevention portion.

* * * * *